United States Patent [19]

Kane et al.

[11] Patent Number: 5,040,747
[45] Date of Patent: Aug. 20, 1991

[54] GRIPPING AND LOCKING ARRANGEMENT FOR AIRCRAFT FLAP DOORS OR UNDERCARRIAGES

[75] Inventors: Brian Kane, Budenheim; Jürgen Laude, Ingelheim, both of Fed. Rep. of Germany

[73] Assignee: Feinmechanische Werke Mainz GmbH, Fed. Rep. of Germany

[21] Appl. No.: 484,498

[22] Filed: Feb. 23, 1990

[30] Foreign Application Priority Data

Feb. 27, 1989 [EP] European Pat. Off. ........ 89103378.9

[51] Int. Cl.[5] ............................................. B64C 25/26
[52] U.S. Cl. ............................ 244/102 R; 244/129.4; 244/102 SL; 294/82.26
[58] Field of Search ............. 244/102 R, 129.4, 129.5, 244/102 SL; 294/82.26, 82.3, 82.34, 82.28

[56] References Cited

U.S. PATENT DOCUMENTS

| | | | |
|---|---|---|---|
| 2,868,482 | 1/1959 | Westcott, Jr. | 244/102 R |
| 3,787,012 | 1/1974 | Jakubowski, Jr. | 294/82.26 X |
| 4,441,674 | 4/1984 | Holtrop | 294/82.26 X |
| 4,568,045 | 2/1986 | Mayer | 244/102 R |

Primary Examiner—Joseph F. Peters, Jr.
Assistant Examiner—Carla Mattix
Attorney, Agent, or Firm—Gifford, Groh, Sprinkle, Patmore and Anderson

[57] ABSTRACT

A gripping and locking arrangement for an aircraft movable component such as a flap door or undercarriage comprises a piston and a piston rod operative as a means for sensing a closing movement of the flap door or undercarriage, and also operative automatically actively to pull same by means of a closing hook into a position in which it is to be locked. The arrangement includes a locking member displaceable within the piston to move lock elements into a locking position and to hold them in the locking position until the arrangement receives a hydraulic pressure signal for causing lowering of the flap door or undercarriage, and the locking member is then displaced whereby the lock elements move into a release position. The hydraulic oil pressure can then act on the piston to produce displacement thereof into a position in which the closing hook releases the flap door or undercarriage component.

19 Claims, 2 Drawing Sheets

GRIPPING AND LOCKING ARRANGEMENT FOR AIRCRAFT FLAP DOORS OR UNDERCARRIAGES

BACKGROUND OF THE INVENTION

Modern aircraft often have a considerable number of components such as flap doors, for example for covering the undercarriage when in the retracted condition, and also undercarriage assemblies themselves, in which respect there is frequently a need for such a flap door or undercarriage assembly to be firmly held in a closed or retracted position respectively, not least to ensure flight safety.

In the present specification, the term aircraft movable component is used to denote a component such as a flap door or undercarriage member, which is movable relative to a body portion of the aircraft and which is required to be suitably locked in an appropriate, generally closed or retracted, position.

Aircraft flap doors and in particular those which are used to cover the undercarriage of the aircraft when in a retracted condition, are generally relatively wide and therefore can suffer from twisting when they are caused to perform a pivotal movement, in particular because, for design reasons, the piston-cylinder unit for closing such a flap door by means of a pivotal movement thereof engages the flap door at an off-center position and indeed is usually pivotally connected to the flap door at one side or edge thereof. It can therefore frequently happen that the hydraulic piston-cylinder unit can pull the flap door into the position of closing the opening to be covered thereby, at one side of the flap door, while at the other side of the flap door which is remote from the location at which the piston-cylinder unit engages same, there is a gap which in some circumstances may even be of considerable size. As careful closing of flap doors in aircraft is an absolutely essential requirement, steps have ben taken up to the present time to ensure that, as the flap door approaches the opening to be closed thereby, the flap door actuates a valve for operating a hydraulic gripper which engages the flap door as it approaches the joining and pulls it completely into the position of securely closing the opening. The flap door is then locked in the closed position, by a separate operation. It will be appreciated that those arrangements involve a considerable level of structural expenditure which increase the cost of the aircraft and also make it heavier.

SUMMARY OF THE INVENTION

An object of the present invention is to provide a gripping and locking arrangement for an aircraft movable component, such as a flap door or undercarriage mechanism, which can be smaller, lighter and also cheaper than previous apparatuses.

Still another object of the present invention is to provide an arrangement for gripping an aircraft movable component and locking it in position, which affords reliability of operation combined with simplicity of construction.

In accordance with the present invention, these and other objects are achieved by a gripping and locking arrangement for an aircraft movable component, comprising a closing hook which is connected to a piston rod and which is movable with the piston rod between lower and upper positions. The piston rod is displaceable by a piston which can assume upper, middle and lower positions in a cylinder in which the piston is slidable, which piston can be urged upwardly or downwardly by oil pressure. The piston has a space therewithin for slidably accommodating a piston-like locking member having a retraction space for receiving at least one lock element in a retracted or inoperative position of the lock element. The cylinder in which the piston is slidable has a receiving or locking space for receiving the at least one lock element in the extended locking position thereof, which is the position that can be reached when the piston is in the upper position. The piston is in its lower position when the closing hook is in its lower position and, by the aircraft movable component encountering the closing hook and urging it upwardly in the course of its closure movement, the piston can be moved upwardly into its middle position in which an oil pressure is adapted to act on the piston to urge it into its upper position in which the piston-like locking member urges the at least one lock element into the locking position thereof, thereby to provide a secure fixed connection between the piston and the cylinder. When the piston-like locking member and the piston are subjected to an oil pressure with the piston in the upper position, the at least one lock element is movable into its retracted position so that the piston is then released for movement towards its lower position.

As will be seen in greater detail from the description hereinafter of a preferred embodiment of the present invention, the present invention provides that the piston acts as a form of sensor for sensing the aircraft movable component as it approaches same, and it serves as a switching element for automatically controlling the operating procedure of the arrangement. It is therefore only necessary to supply the arrangement with a simple hydraulic control command for 'opening of the flap door' or 'closing of the flap door', and the various operating movements which give the desired result then take place automatically without requiring the presence of a separate control valve.

In accordance with preferred features of the invention, the arrangement has oil connecting bores or ducts which are in direct communication with the pressure oil connection of the hydraulic drive means for the aircraft movable component such as a flap door. The oil connecting bore or duct which is provided for upward movement of the movable component opens into the cylinder at a location of the cylinder wall, which is covered when the piston is in its lower position and open when the piston is in its middle position.

The closing hook may be part of a catch lever for engaging the aircraft movable component such as a flap door or undercarriage member, which can be pivotally mounted to the arrangement and which has a mouth opening which is pivotable between a closure position which is for example an upper position and a catch position which is for example a lower position. That configuration represents a safe, sound construction as the holding forces involved are applied to and distributed to two locations, namely the pivot mounting for the catch lever on the arrangement, and the location at which the piston provides its locking effect in relation to the catch lever.

The locking member which is slidable within the piston may occupy first and second positions relative to the piston, more specifically a first or for example upper position in which the at least one lock element is urged radially outwardly, and a second or lower position in which the at least one lock element is displaced radially inwardly. The locking member may have cam surface means which come into operation when the locking member is displaced from the second or lower position into the first or upper position are urge the at least one lock element radially outwardly. The cylinder may have inclined surface means which come into operation when the locking member is displaced from the first or upper position into the second or lower position and urge the at least one lock element radially inwardly. The locking member may be biased towards the first or upper position by means of a spring so that it tends to occupy that position when the piston reaches its upper position and the at least one lock element can withdraw into a lateral space in the cylinder. Otherwise, the cylinder wall prevents displacement of the at least one lock element and therewith the locking member into its first or upper position.

So the aircraft movable component such as a flap door can be operated, for example opened, by hand in order to permit maintenance operations for example to be carried out thereon, the piston rod may have a longitudinal bore or passage for accommodating a rod-like or bar-like extension portion of the locking member which is slidable within the piston, and a transverse bore or passage to permit access to the extension portion so that the locking member can be manually moved into its position of releasing the at least one lock element. In that way for example it is possible to use a screwdriver or other lever or tool to displace the locking member manually into the position thereof in which it releases the lock element, whereby at the same time the lock element or elements is or are withdrawn from the locking position thereof, that is to say out of the space in the cylinder wall in which the at least one lock element is accommodated to provide the locking effect, and the weight of the movable component such as a flap door or undercarriage member ensures that the movable component then moves downwardly into the desired position.

In accordance with another preferred feature, such an opening movement may not take place abruptly for flow transfer ducts or passages may be provided between the upper and lower regions of the cylinder, being separated from each other by the piston as it moves within the cylinder and thus permitting only a slow element of the piston, with a damper or shock-absorber effect.

Further objects, features and advantages of the present invention will be apparent from the following description with reference to the accompanying drawings.

DESCRIPTION OF THE PREFERRED EMBODIMENT

Figure 1:
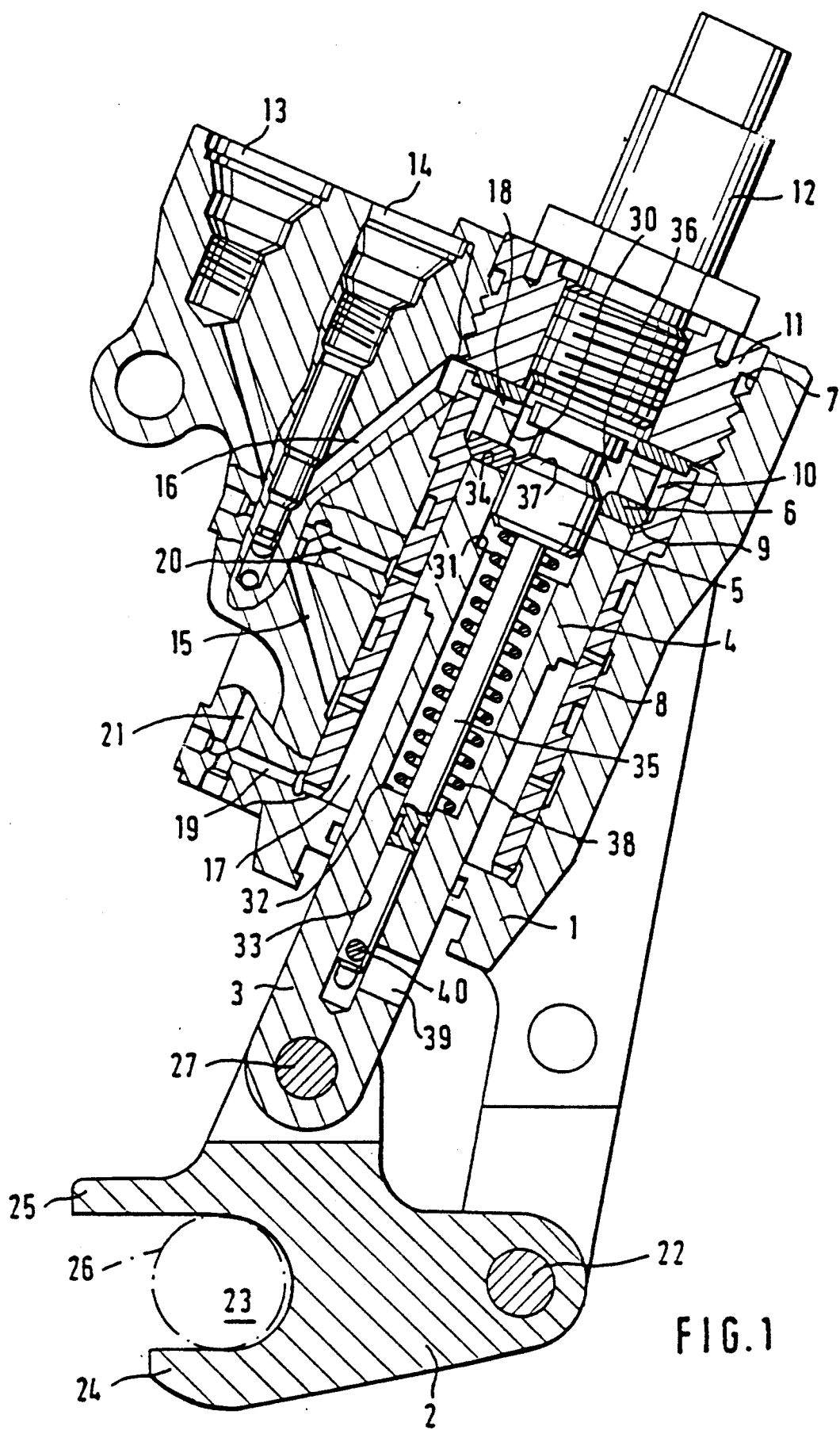
FIG. 1 shows the gripping and locking arrangement according to the invention in an upper position thereof.

Referring firstly to FIG. 1, shown therein are the major components of the gripping and locking arrangement according to the invention for an aircraft movable component such as a flap door or undercarriage member, including a housing 1, a closing hook 2 which is pivotally mounted to the housing 1 in a manner to be described in greater detail hereinafter, a piston rod 3 pivotally connected to the closing hook 2, a piston 4 operatively connected to or integral with the piston rod 3, a locking member 5 and lock elements 6.

The housing 1 has a stepped bore 7 into which is fitted a sleeve or liner as indicated at 8, forming a cylinder therein. Provided in the upper region of the cylinder 8 is an inclined surface as indicated at 9 and a deflection or locking space as indicated at 10. The bore 7 is closed at the upper end of the housing 1 by means of a screw ring 11 and a proximity switch 12 which is screwed into the screw ring 11.

Figure 3:
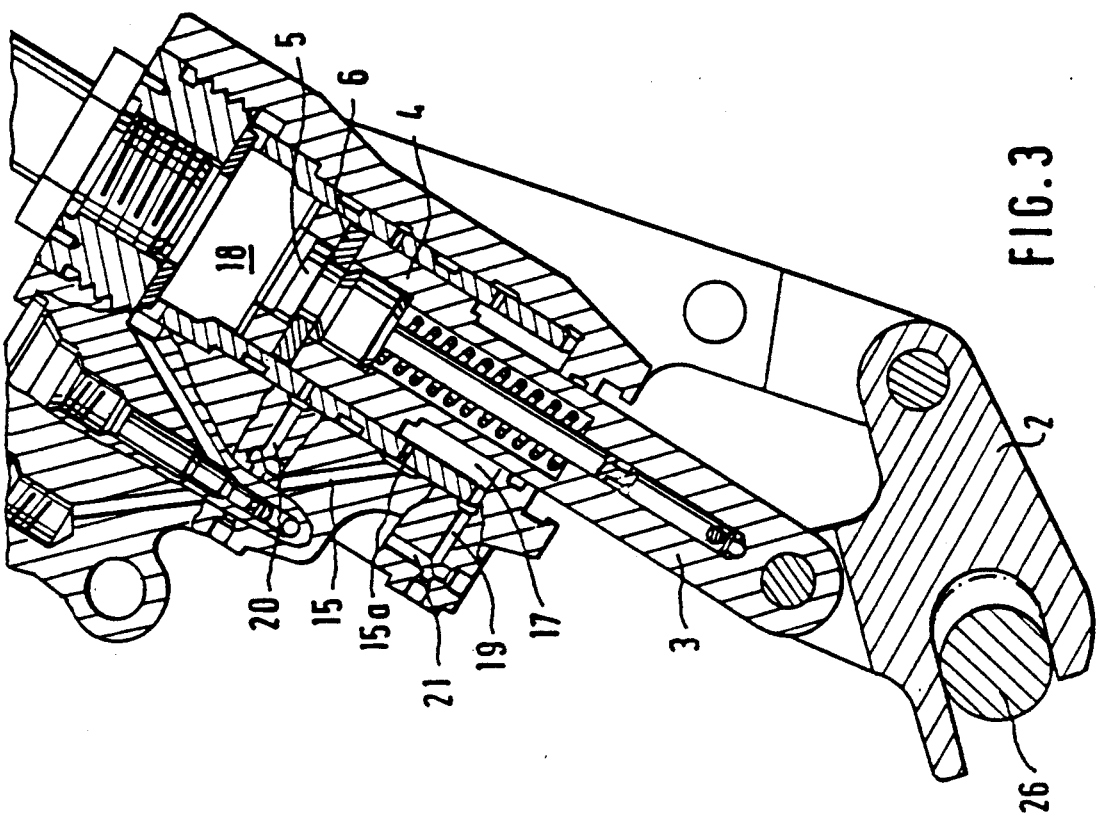
FIG. 3 is a view of the FIG. 1 arrangement on a reduced scale, in the middle position thereof.
Figure 2:
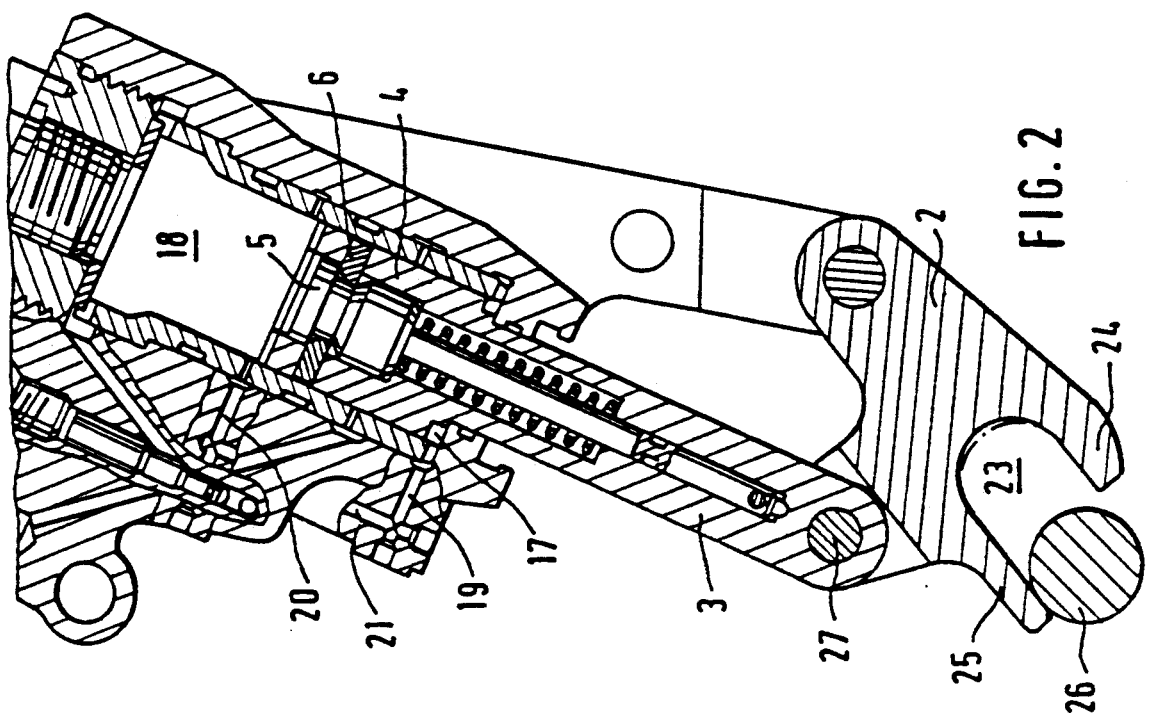
FIG. 2 is a view of the FIG. 1 arrangement on a reduced scale, in a lower position thereof.

The housing 1 also has first and second connecting bores or ducts 13 and 14 for hydraulic oil, which communicate by way of ducts or passages 15 and 16 with the lower and upper regions respectively of the stepped bore 7, from which hydraulic oil can then flow into a lower cylinder chamber indicated at 17 and an upper cylinder chamber indicated at 18 respectively. Also provided between the upper and lower regions of the cylinder 8 are flow transfer passages as indicated at 19, 20 and 21. In that way the piston 4 may be moved upward, from its lower position as shown in FIG. 2 into its middle position as shown in FIG. 3 as the oil which is displaced out of the upper cylinder chamber 18 above the piston 4 can at least in part flow into the lower cylinder chamber 17 by way of the ducts or passages 19, 20 and 21. Shortly before the piston 4 reaches its middle position the passage or duct 20 is closed off by the piston 4 and at the same time or shortly thereafter, an opening which is indicated at 15a in FIG. 3 is opened. The flow transfer passages or ducts 19, 20 and 21 are operative in the reverse direction of flow of oil therethrough when the piston moves in a downward direction.

As indicated above, the closing hook 2 is pivotally mounted to the housing 1, more specifically being pivotally mounted to a projection portion (not referenced) on the housing 1, by way of a shaft or spindle as indicated at 22 in FIG. 1. At its free end, remote from the pivot mounting spindle 22, the closing hook 2 has a mouth opening 23 defined by first and second side portions 24 and 25. It will be seen that the side portion 25 is longer than the side portion 24 so that, when a closing pin member 26 on the aircraft movable component such as a flap door or undercarriage moves upwardly towards the closing hook 2, the pin member 26 comes to bear against the side portion 25 and is thereby guided into the mouth opening 23, as can be most clearly seen from a comparison between FIGS. 2 and 3. As the pin portion 26 moves into the mouth opening 23, until it assumes the position of being fully accommodated therein as shown in FIG. 1, the closing hook 2 is also pivoted in a clockwise direction in FIG. 1, into the position shown therein.

The closing hook 2 is also connected pivotally to the lower end of the piston rod 3 by way of a further shaft or spindle 27. The spindles 22 and 27 permit lateral displacement of the closing hook 2, within certain limits. It is also possible for a plurality of closing hooks 2 to be disposed along the spindles 22 and 27, which are of an elongate configuration for that purpose.

As illustrated the piston rod 3 and the piston 4 are formed integrally together and provide within same a stepped bore 30 having a shoulder 31 for restricting movement of the locking member 5 within same, a further shoulder 32 acting as a seat for a spring 38, and an extension bore portion 33. Radial openings or passages 34 lead outwardly from the stepped bore 30 and each slidably accommodate a respective lock element 6. The piston-like locking member 5 has a bar-like extension portion 35 which is slidably guided in the extension bore portion 33. Provided on the locking member 5 is an annular groove 36 which is delimited by a cam surface 37 and into which the lock elements 6 may move when the locking member 5 is in the position shown in FIGS. 2 and 3, relative to the piston 4. The above-mentioned spring 38 which applies a force of about 40 to 50 Newtons bears at its lower end against the above-mentioned shoulder 32 and at its upper end against the bottom portion of the locking member 5, thereby to urge the locking member 5 upwardly. In the lower region of the extension bore portion 33, a transverse slot or opening 39 is provided in the piston rod 3, which communicates with the extension bore portion 33, while a pin 40 is provided in the extension portion 35 connected to the locking member 5.

When in operation of the arrangement the closing pin member 26 of the aircraft movable component comes to bear against the side portion 25 of the closing hook 2, then, upon further upward movement of the aircraft movable component, the pin member 26 is guided into the mouth opening 23 of the closing hook 2, as shown in FIG. 2, whereupon the further movement of the movable component results in a pivotal movement of the closing hook 2, as indicated in FIG. 3. Further upward movement of the movable component such as a flap door causes the piston rod 3 and therewith also the piston 4 to be raised and moved into the middle position thereof, as shown in FIG. 3. In that situation, the outlet opening 15a of the passage or duct 15 is opened, the passage or duct being under hydraulic pressure at that time, because the connecting bore 13 is in communication with the same hydraulic pressure as that which has been supplied to the piston-cylinder unit (not shown) for driving and displacing the aircraft movable component such as a flap door.

Accordingly, the lower cylinder chamber 17 of the gripping and locking arrangement illustrated in subjected to pressure and the piston 4 moves actively upwardly into the closing position thereof as shown in FIG. 1. Admittedly, as a result of the force of the spring 38 and the effect of the cam surface 37, the locking member 5 tries constantly to urge the lock elements 6 radially outwardly, but that is prevented by virtue of the presence of the cylinder 8 radially outwardly of the lock elements 6. It is only when the piston 4 moves into a position in which the lock elements 6 are adjacent the space 10 that the lock elements 6 can move radially outwardly into that space. Consequently, the locking member 5 can occupy its upper position as shown in FIG. 1, relative to the piston 4.

The proximity switch 12 serves to check that the locking member 5 has safely reached its upper position.

When the arrangement is in that upper position, for example while the aircraft is in flight, the locking member 5 prevents the lock elements 6 from moving radially inwardly again. If accordingly strong pulling forces are transmitted by way of the pin member 26 to the closing hook 2 and the piston rod 3 and therewith the piston 4, then those forces are transmitted by way of the sides of the radial openings or passages 34 to the lock elements 6 and from there by way of the inclined surface 9 to the cylinder 8 which can securely carry the forces involved. The lock elements 6 bear against the sides of the radial openings or passages 34, the inclined surface 9 and the surface of the lock member 5 over a substantial surface area, so that significant forces can be transmitted and carried by the arrangement, without the hydraulic system being involved with such forces.

When the aircraft movable component is to be lowered, for example a flap door is to be opened, pressure oil passes into the connecting bore 14 and the passage or duct 16, and thus into the upper cylinder chamber 18 which accordingly acts on the piston-like locking member and urges it downwardly in the drawing until it comes to bear against the shoulder 31 in the stepped bore 30 in the piston 4. The lock elements 6 are now disposed in opposite relationship to the annular groove 36 in the locking member 5 and can thus move radially inwardly into same, especially as a radial pressure force component is applied to the lock elements 6 by the inclined surface or surfaces 9, as a result of the tendency on the part of the piston 4 to move axially. The hydraulic pressure which continues to act urges the piston 4 downwardly, once the lock elements 6 have come out of locking engagement with the inclined surface 9, until the piston 4 reaches the position shown in FIG. 2. In that position the closing pin member 26 can come out of the mouth opening 23 in the closing hook 2, especially as, at the same time as oil pressure is applied to the connecting bore 14, the piston-cylinder unit for operating the movable flap door is also actuated to produce the downward movement of the flap door.

It will be seen therefore that, when the piston-cylinder unit for operating the flap door comes into operation, at the same time the above-described gripping and locking arrangement according to the invention is obviously appropriately actuated and autonomously controls its own operating movements to produce the desired effect.

In the event of failure of hydraulic pressure, the gripping and locking arrangement according to the invention can be released by hand. For that purpose, the arrangement has the transverse slot or opening 39 leading in the piston rod 3 to the extension bore portion 33, and the pin 40 or other engagement means permitting the locking member 5 to be pulled downwardly into its lower position. In practice, a screwdriver or like lever tool will be inserted between the edge of the opening or slot and the pin 40 and then pivoted to cause the pin 40 and therewith the locking member 5 to be pressed downwardly. That causes the lock elements 6 to be moved into the unlocked position and consequently the piston 4 will be pulled downwardly by the weight of the aircraft movable component, successively passing through the positions shown in FIGS. 3 and 2. In that situation the flow transfer passages or ducts 19, 20 and 21 are partially effective to pass oil displaced out of the lower cylinder chamber 17 into the upper cylinder chamber 18.

It will be appreciated that the above-described construction has been set forth solely by way of example and illustration of the principles of the present invention and that various modifications and alterations may be made therein without thereby departing from the spirit and scope of the invention.

We claim:

1. A gripping and locking arrangement for an aircraft movable component comprising:
   a cylinder;
   a piston slidably displaceable in said cylinder and movable within said cylinder between upper, middle and lower positions;
   a piston rod operatively connected to said piston;

a closing hook connected to said piston rod and movable thereby between a lower position and an upper a piston-like locking member resiliently biased to a locking position and slidably displaceable within said piston, to an unlocking position, said locking member having a retraction space;

a locking space provided in the cylinder;

at least one key lock element carried by said piston and displaceable between a position of being retracted into said retraction space in said locking member and a locking position of being received in said locking space in said cylinder, said key lock element being in said locking position when said piston is in its upper position and said locking member is in said locking position; and first oil duct means for applying actuating oil pressure in said cylinder to displace said locking member to said unlocked position and said piston towards said lower position;

second oil duct means for applying actuator oil in said cylinder to displace said piston towards said locked position;

said arrangement being such that said piston occupies its lower position when said closing hook is in a position to be operatively encountered by said aircraft moveable component as it moves upwardly whereby said piston can be moved upwardly into said middle position in which said second oil duct means applies actuating oil pressure on said piston to urge it towards said upper position in which said locking member is operative to urge said at least one key lock element into said locking position thereof, thereby to provide a secure connection between said piston and said cylinder, and when said locking member and said piston are acted upon by oil pressure from said first oil duct means when said piston is in said upper position said locking member is displaced to said unlocking position and said at least one key lock element is displaced into its retracted position by the displacement of said piston and said piston is released for movement in a downward direction.

2. An arrangement as set forth in claim 1 including oil connecting ducts adapted to be in communication with the hydraulic system for actuation of said aircraft movable component, wherein said second oil duct means communicates with said cylinder at a location of said cylinder which is covered by said piston in said lower position thereof and opened with said piston in said middle position and said upper position.

3. An arrangement as set forth in claim 1 wherein the closing hook is part of a catch lever for said aircraft movable component, having a mouth opening adapted to receive a portion of said movable component, and being pivotably mounted on said arrangement between an upper position for holding the movable component and a lower position for catching the movable component.

4. An arrangement as set forth in claim 1 wherein said locking member is movable relative to the piston between a first position in which said key lock element is urged radially outwardly and a second position in which said key lock element is displaceable radially inwardly.

5. An arrangement as set forth in claim 4 wherein said locking member has can surface means which become operative upon displacement of said locking member from said unlocking position to said locking position to urge said key lock element radially outwardly and wherein said cylinder has inclined surface means which become operative upon displacement of said locking member from said locking position to said unlocking position and the displacement of said piston from said upper position to urge said key lock element radially inwardly.

6. An arrangement as set forth in claim 4 including a spring urging said locking member towards said locking position.

7. An arrangement as set forth in claim 1 wherein said locking member has an extension portion thereon and said piston rod has a longitudinal passage accommodating said extension portion of said locking member, said piston rod further having a transverse opening for affording access to the extension portion in said passage in order for said locking member to be moved manually into said unlocking position.

8. An arrangement as set forth in claim 1 including flow transfer ducts between lower and upper regions of said cylinder which are separated from each other by said piston.

9. A gripping and locking arrangement for an aircraft movable component comprising:

a cylinder;

a piston slidably displaceable in said cylinder and movable within said cylinder between upper, middle and lower positions;

a piston rod operatively connected to said piston;

a closing hook connected to said piston rod and movable thereby between a lower position and an upper position;

a piston-like locking member slidably disposed within said piston and providing a retraction space;

a locking space provided in said cylinder;

at least one lock element carried by said piston and displaceable between a position of being retracted into said retraction space in said locking member and a locking position of being received in said locking space in said cylinder, said lock element being in said locking position when said piston is in its upper position; and oil duct means for applying actuating oil pressure to the piston;

said arrangement being such that said piston occupies its lower position when the closing hook is in a position to be operatively encountered by said aircraft movable component as it moves upwardly whereby said piston can be moved upwardly into its middle position in which oil pressure is adapted to act on said piston to urge it towards its upper position in which said locking member is operative to urge said at least one lock element into the locking position thereof said locking member is movable relative to said piston between a first position in which said lock element is urged radially outwardly and a second position in which said lock element is displaced radially inwardly, and wherein said locking member has can surface means which become operative upon displacement of said locking member from its second into its first position and urge said lock element radially outwardly and wherein said cylinder has inclined surface means which become operative upon displacement of said locking member from said first into said second position and urge said lock element radially inwardly;

thereby to provide a secure connection between said piston and said cylinder, and when said locking member and said piston ar acted upon by oil pressure when said piston is in said upper position said at least one lock element is movable into its retraced position whereby said piston is released from the cylinder for movement in a downward direction.

10. A gripping and locking arrangement for an aircraft moveable component comprising:
   a cylinder;
   a piston slidably displaceable in said cylinder and movable within said cylinder between upper, middle and lower positions;
   a piston rod operatively connected to said piston;
   a closing hook connected to said piston rod and movable thereby between a lower position and an upper position;
   a piston-like locking member slidably disposed within said piston and providing a retraction space;
   said locking member having an extension portion thereon and said piston rod having a longitudinal passage accommodating said extension portion of said locking member, and a transverse opening for affording access to said extension portion in said passage in order for said locking member to be moved manually into its said second position;
   a locking space provided in the cylinder;
   at least one lock element carried by said piston and displaceable between a position of being retracted into said retraction space in said locking member and a locking position of being received in said locking space in said cylinder, said lock element being in the locking position when the piston is in its upper position; and
   oil duct means for applying actuating oil pressure to said piston;
   said arrangement being such that the piston occupies its lower position when the closing hook is in a position to be operatively encountered by said aircraft movable component as it moves upwardly whereby said piston can be moved upwardly into its middle position in which oil pressure is adapted to act on said piston to urge it towards its upper position in which said locking member is operative to urge said at least one lock element into said locking position thereof;
   thereby to provide a secure connection between said piston and said cylinder, and when said locking member and said piston are acted upon by oil pressure when said piston is in said upper position said at least one lock element is movable into its retracted position whereby said piston is released from the cylinder for movement in a downward direction.

11. A gripping and locking apparatus for an aircraft movable component comprising:
   a cylinder;
   a piston slidably displaceable in said cylinder and movable within said cylinder between upper, middle and lower positions;
   a piston rod operatively connected to said piston;
   a closing hook connected to said piston rod and movable thereby between a lower position and an upper position;
   a locking member resiliently biased to a locking position and slidably displaceable within the piston to an unlocking position, said locking member having a retraction space;
   a locking space provided in the cylinder;
   at least one lock element carried by said piston and displaceable to a position of being retracted into said retraction space in said locking member when said locking member is in said unlocking position and said piston is displaced from upper position, and displaceable to a locking position engaging said locking space in said cylinder in response to said piston being in said upper position and said locking member being resiliently displaced to said locking position;
   first means for applying actuating oil pressure in said cylinder to displace said locking member to said unlocking position and displace said piston towards said lower position; and
   second means for applying actuator oil pressure to said piston to displace said piston towards said upper position.

12. A catch arrangement for gripping and locking an aircraft movable component comprising:
   a cylinder;
   a piston slidably displaceable in said cylinder and movable within said cylinder between upper, middle and lower positions;
   a piston rod connected to said piston;
   a closing hook linked to said piston rod and movable thereby between a lower position and an upper position;
   a piston-like locking member slidably disposed within said piston and providing a retraction space;
   a locking space provided in said cylinder;
   lock element means carried by said piston and displaceable between a position of being retracted into said retraction space in said locking member and a locking position of being received in said locking space in said cylinder, said lock element means being in said locking position when said piston is in its upper position; and
   oil duct means including a first control passage for raising said piston and a second control passage for lowering said piston,
   the arrangement being such when said piston occupies its lower position said closing hook is in a position to be operatively encountered by said aircraft movable component as it moves upwardly whereby said piston can be moved upwardly into its middle position in which said first control passage is adapted to have pressurized oil acting on said piston to urge it towards its upper position in which said locking member is operative to urge said lock element means into said locking position thereof, thereby to provide a secure connection between said piston and said cylinder, and when said piston is in said upper position and said second control passage is addressed, said locking member and said piston are acted upon by oil pressure and said lock element means is movable into its retracted position whereby said piston is released from said cylinder for movement in a downward direction.

13. An arrangement as set forth in claim 12 including oil connecting ducts adapted to be in communication with a hydraulic system for actuation of said aircraft movable component, wherein a first connecting duct communicates with said cylinder at a location of said cylinder which is covered by said piston in the lower position thereof and exposed in said middle position of said piston.

14. An arrangement as set forth in claim 12 wherein said closing hook is part of a catch lever for the aircraft movable component, having a mouth opening adapted to receive a portion of said movable component, and being mounted on said catch arrangement pivotably between an upper position for holding the movable component and a lower position for catching the movable component.

15. An arrangement as set forth in claim 12 wherein said locking member is movable relative to said piston between a first position in which said lock element is urged radially outwardly and a second position in which said lock element is displaced radially inwardly.

16. An arrangement as set forth in claim 15 wherein said locking member has cam surface means which become operative upon displacement of said locking member from its second into its first position and urge said lock element radially outwardly and wherein said cylinder has inclined surface means which become operative upon displacement of said locking member from said first into said second position and urge said lock element radially inwardly.

17. An arrangement as set forth in claim 15 including a spring urging said locking member towards its first position.

18. An arrangement as set forth in claim 13 wherein said locking member has an extension portion thereon and said piston rod has a longitudinal passage accommodating said extension portion of said locking member, and a transverse opening for affording access to said extension portion in said passage in order for said locking member to be moved manually into it second position.

19. An arrangement as set forth in claim 13 including flow transfer ducts between lower and upper regions of said cylinder which are separated from each other by the piston.

* * * * *